US006406229B1

(12) United States Patent
Derrick et al.

(10) Patent No.: US 6,406,229 B1
(45) Date of Patent: Jun. 18, 2002

(54) CLAMP FOR HOLDING A WORKPIECE ON MILLING MACHINE TABLE

(75) Inventors: Scott E. Derrick, Lexington; Scott J Echerer, Cayce, both of SC (US)

(73) Assignee: Alpha Manufacturing Co., Inc. (CO)

(*) Notice: Subject to any disclaimer, the term of this patent is extended or adjusted under 35 U.S.C. 154(b) by 0 days.

(21) Appl. No.: 09/562,881

(22) Filed: May 1, 2000

(51) Int. Cl.[7] .............................. B23C 9/00; B25B 1/04

(52) U.S. Cl. ......................... 409/225; 269/91; 269/101; 409/219

(58) Field of Search ................................ 409/225, 219; 269/91, 92, 93, 900, 71, 303, 101, 239; 408/109

(56) References Cited

U.S. PATENT DOCUMENTS

| | | | | | |
|---|---|---|---|---|---|
| 1,131,869 | A | * | 3/1915 | Schade | 269/91 |
| 1,175,811 | A | * | 3/1916 | Ray | 269/91 |
| 2,281,482 | A | * | 4/1942 | Crayton | 269/93 |
| 2,559,716 | A | * | 7/1951 | Gaudreau | 269/93 |
| 2,991,669 | A | * | 7/1961 | Stock | 269/92 |
| 3,452,976 | A | * | 7/1969 | Ross | 269/92 |
| 3,680,268 | A | * | 8/1972 | Lorton | 269/91 |
| 3,830,485 | A | * | 8/1974 | Mickelsson et al. | 409/219 X |
| 4,294,442 | A | * | 10/1981 | Kolnes et al. | 269/101 |
| 4,505,624 | A | * | 3/1985 | Kelly, Jr. | 408/109 |
| 4,530,493 | A | * | 7/1985 | Break | 269/93 |
| 4,600,184 | A | * | 7/1986 | Ashworth | 269/303 |
| 4,828,240 | A | * | 5/1989 | Congenecker et al. | 269/900 |
| 5,913,509 | A | * | 6/1999 | Price et al. | 269/71 |
| 5,984,292 | A | * | 11/1999 | Troha | 269/91 |

* cited by examiner

*Primary Examiner*—William Briggs
(74) *Attorney, Agent, or Firm*—Michael A Mann; Nexsen Pruet Jacobs & Pollard LLC

(57) ABSTRACT

A clamp for securing an oversized work-piece to a milling machine table using the T-slot on the front surface of a Bridgeport-type milling machine table. The clamp, when attached to the T-slot, extends beyond the table and over it where it can be tightened down on a work-piece to hold it to the top surface of the table. The clamp includes a heel block and a clamp block held in spaced relation by a separation bolt and a tightening bolt. To mill an oversized work-piece, the clamp is inserted into the T-slot and then the separation distance of the clamp block to the heel block is adjusted by rotating the clamp block around the separation bolt until the separation distance is slightly wider than the thickness of the work-piece. The tightening bolt is then used to tighten the clamp onto the work-piece. The nose end of the heel block can be shaped to match the profile of the T-slot or can be modified to allow the nose to be rotated into the slot by rounding its corners. The blocks are formed to allow the tightening bolt to be positioned so that it is more or less close to the separation bolt in order to accommodate work-pieces of different sizes.

10 Claims, 2 Drawing Sheets

CLAMP FOR HOLDING A WORKPIECE ON MILLING MACHINE TABLE

FIELD OF THE INVENTION

The present invention relates generally to the manufacturing and machine tool industry, sometimes known as toolmaking.

BACKGROUND OF THE INVENTION

There are many different methods that machinists use to hold a work-piece to a milling machine table so that machining operations and statistical measuring processes can be performed on the work-piece. Most milling machine tables have T-shaped slots that traverse the top of the table. Those slots accommodate a variety of different clamps, fixtures, grips and T-shaped bolts that are used to hold a work-piece firmly in place. The table with the attached work-piece may then be moved in three dimensions either manually or by computer (CNC) as the milling machines'cutting tool engages the work-piece. Usually, the size of work-piece itself is limited to the size of the table on the milling machine or the extent of the feature(s) being machined. In relative terms, a larger work-piece generally requires a larger milling machine which, in turn, comes equipped with a larger table with more clamping space. If the work-piece is larger than the available table, there is often no means of securing the work-piece to the table even if the individual features being machined are small enough for the smaller milling machine to produce them. Therefore, there exists a need to firmly secure a large work-piece to a smaller milling machine table such as when the size of the work-piece extends beyond the edge of the milling machine table and does not allow access to the T-slots on the top of the table.

SUMMARY OF THE INVENTION

According to its major aspects and briefly stated, the present invention is a clamping device for securing an oversized work-piece to a milling machine table, especially to a smaller milling machine table. Whereas conventional clamping methods make use of the T-slots on the top of the table, this invention makes use of the T-slot that is typically located on the front of all Bridgeport-type milling machine tables along a plane perpendicular to and offset from the working plane defined by the table on which milling work-pieces are typically mounted. The existing front T-slot comes as a standard feature on Bridgeport-type milling machines and is most often used for securing moveable, mechanical limit switches. The limit switches are used in automated machining operations to define the stopping end-points for the table when it moves through machining cycles.

The primary feature of the present invention is the ability to make use of the front T-slot on the table to hold a work-piece to the table. The present invention is a clamp that is secured to the table using this front T-slot. The clamp is capable of holding an oversized work-piece to the table without having access to any of the top surface T-slots that are typically used for clamping. A part of the clamp called the "heel block" attaches to the table's front T-slot, which is located in a plane perpendicular to the table's surface, below both the working surface of the table and the work-piece. The heel block extends away from the table and beyond the work-piece. Running parallel with and bolted to the heel block is a clamping block. The bolts holding the clamping block extend from the heel block, past the work-piece, to separate the heel block and clamping block apart by a little more than the thickness of the work-piece. The clamping block then extends parallel to the heel block and above the work-piece that is on the table. The bolts are then adjusted and tightened to provide the desired clamping effect on the work-piece.

An important feature of the present invention is the shape of the end of the heel block. The heel block is shaped to securely fit into the front T-slot so that this slot can be used in lieu of top surface slots. The shape may allow the clamp to be inserted from the end of the T-slot or, in an alternative embodiment, directly in using a slight rotation of the clamp.

One feature of the present invention is the use of multiple tapped holes in one or both of the blocks. This allows for flexibility in mounting work-pieces of different size as well as different degrees of leverage to be applied to the work-piece.

An additional feature of the present invention is a minimal number of tapped holes in either block and the use of slots instead of holes. When slots are used, the tightening bolt has a head on one end and a nut on the other end for compressing the system.

In the case of either slots or holes, one of the bolts (for example, the separation bolt) is merely used as a spacer. It screws into a tapped hole on one of the two blocks to hold itself in position while applying tension on the other bolt (the tightening bolt), thus putting the entire system into compression and holding the work-piece firmly on the table. The actual configuration of the bolts can be varied depending on the needs of the work-piece. Clearly, the separation bolt only needs to be threaded on one end as its other end is used as a dead-stop on the heel block.

Another advantage of the present invention is the fact that one set of clamps fits a wide range of work-pieces because of the use of slots cut on either the heel block, the clamping block, or on both. By putting slots on the preferred embodiment, the clamping block can be adjusted back and forth to hold work-pieces of a wide variety of sizes.

It will be apparent to anyone skilled in the art of machining that several different sizes of clamps and bolts can be used to clamp a large variety of different work-pieces. It will also be apparent to anyone skilled in the art that multiple clamps can and should be used to properly hold a work-piece.

BRIEF DESCRIPTION OF THE DRAWINGS

In the figures.

DETAILED DESCRIPTION OF PREFERRED EMBODIMENTS

The present invention is an improvement in milling machine clamping techniques. In particular, it is (1) a clamp, (2) a combination of a clamp and milling machine, and (3) a method for clamping a workpiece to a milling machine table. The advantages of the present improvement lay primarily in (1) the capability to hold oversized objects to a milling machine table using the front T-slot on a milling machine table that is both offset and in a different plane than the table's top surface that is usually used for mounting and clamping work-pieces and (2) the flexibility to provide a variety of positions and clamping configurations through the use of slots and/or threaded bolt holes on the clamp.

Figure 1:
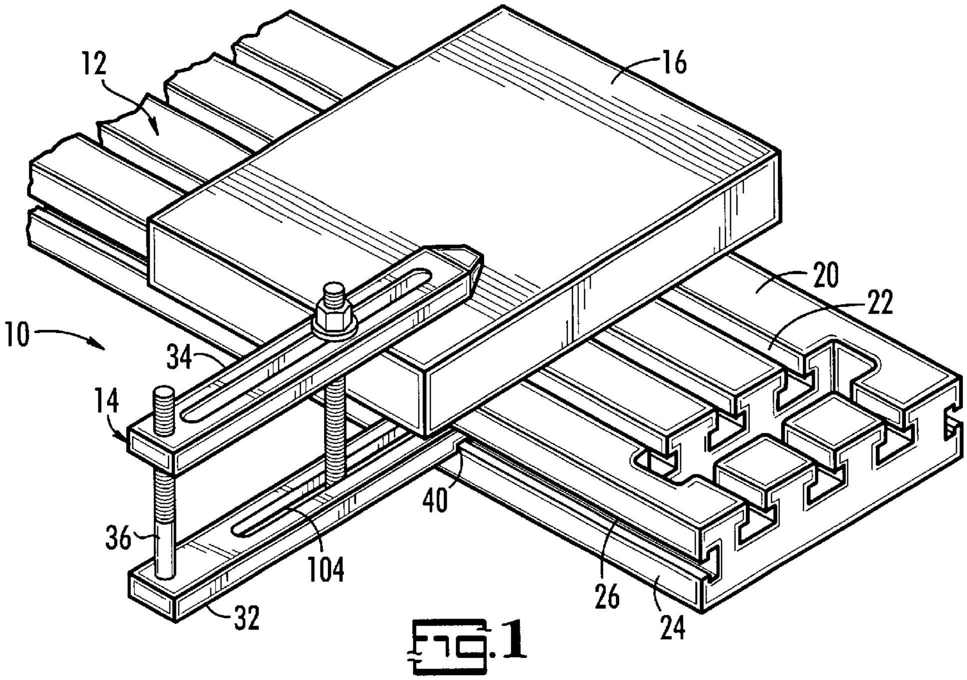
FIG. 1 is a perspective view of the invention, according to a preferred embodiment of the present invention.

Referring now to FIG. 1, there is illustrated a clamping system, generally referred to using the reference number 10, that includes a milling machine table 12 and a clamp 14. FIG. 1 also shows a work-piece 16 which is not part of the present invention. Milling machine table 12 has a top surface 20 having several slots 22 for use with clamps. Milling machine table 12 has a front surface 24 having a T-slot 26 formed therein.

T-slot 26 is used to secure clamp 14 to milling machine table 12. Clamp 14 has a heel block 32 and a clamp block 34 held in spaced relation by a separation bolt 36 and a tightening bolt 38 and which together form the jaws of clamp 14. The nose 40 of heel block 34 is inserted into slot 26 in a mariner that will be described below.

Figure 2:
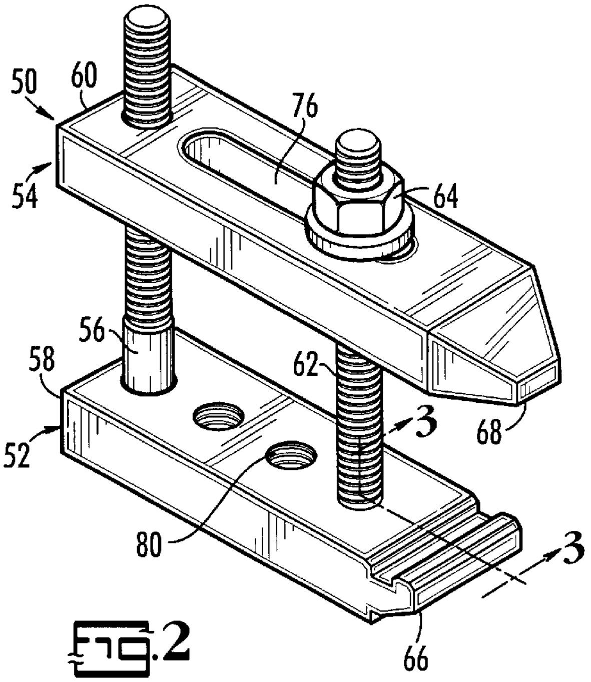
FIG. 2 is a perspective view of a clamp, according to a preferred embodiment of the present invention.
Figure 3:
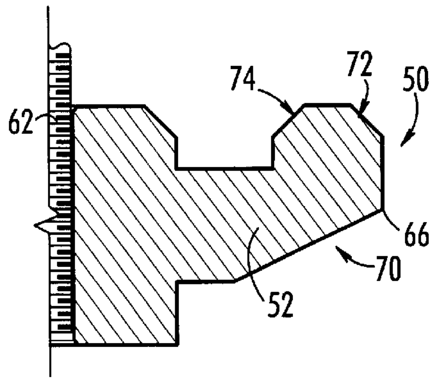
FIG. 3 is a detailed cross sectional view of the clamp illustrated in FIG. 2, taken along lines 3—3.
Figure 4:
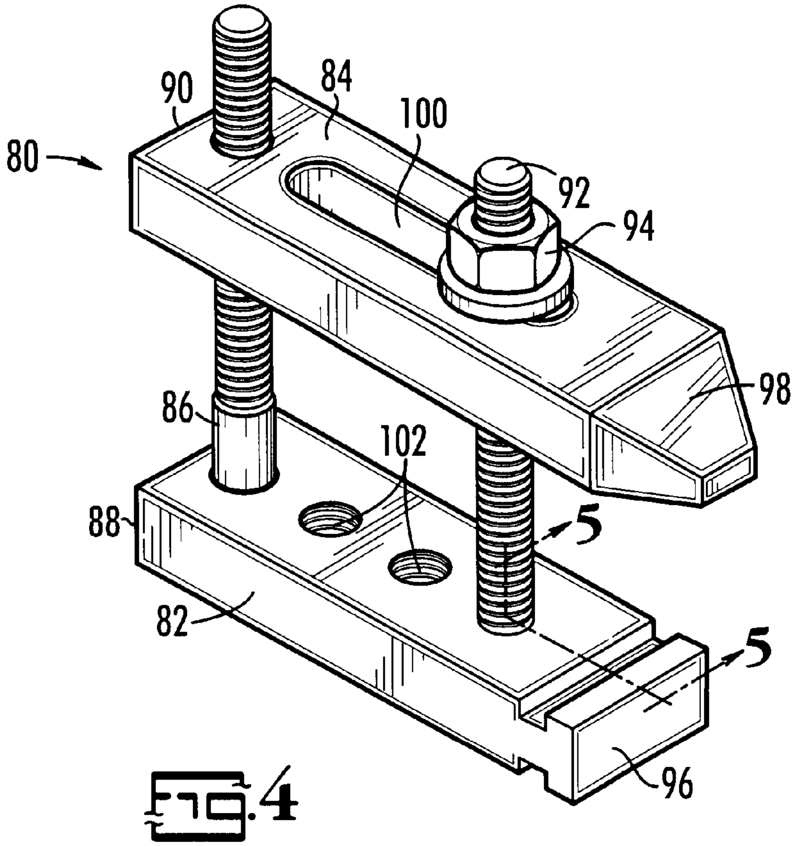
FIG. 4 is a perspective view of a clamp, according to a preferred embodiment of the present invention.
Figure 5:
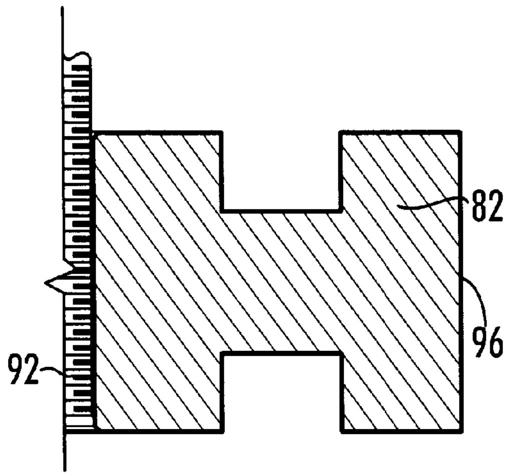
FIG. 5 is a detailed cross sectional view of the clamp illustrated in FIG. 4, taken along lines 5—5.

FIGS. 2 and 3 illustrate a first embodiment of a clamp 50, according to the present invention; FIGS. 4 and 5 illustrate a second, alternative embodiment of a clamp 80, according to the present invention.

Clamp 50 includes a heel block 52 and a clamp block 54. Heel block 52 and clamp block 54 are generally parallel to each other so that they can cooperate to clamp a work-piece therebetween. A separation bolt 56, fixed in heel block 52 and threadedly received in clamp block 54, spaces and holds heel block and clamp block in spaced relation, preferably from a first end of each, 58, 60, respectively. A tightening bolt 62 and nut 64 are used to bring the second ends 66, 68, of each block 52, 54, respectively, together slightly but firmly on a work-piece. Second end 66 of heel block is formed to fit into T-slot 26 and to hold clamp 50 firmly thereto. Furthermore, cutout portions 70, 72, and 74 eliminate right angle corners to facilitate insertion of second end 66 into T-slot 26 from a direction generally perpendicular to the long dimension of T-slot 26 by a slight rotation from a downward direction on the initial insertion approach to a final slightly upward direction.

Clamp 80 includes a heel block 82 and a clamp block 84. Heel block 82 and clamp block 84 are generally parallel to each other so that they can cooperate to clamp a work-piece therebetween. A separation bolt 86, fixed in heel block 52 and threadedly received in clamp block 54, spaces and holds heel block and clamp block in spaced relation, preferably from a first end 88, 90 of each block 82, 84, respectively. A tightening bolt 92 and nut 94 are used to bring the second ends of each, 96, 98, respectively, together slightly but firmly on the work-piece. Second end 96 of heel block 82 is formed to fit into T-slot 26 exactly and to hold clamp 80 firmly thereto. Clamp 80 is inserted in the end of T-slot 26 and slid laterally to the desired position.

FIGS. 2 and 4 illustrate clamps 50 and 80 with slots 76 and 100 and holes 78 and 102, respectively, in clamp blocks 54, 84, respectively. Slots 76 and 100 and holes 78 and 102 facilitate lateral movement of tightening bolts 62, 92 toward and away from separation bolts 56, 86, respectively, to allow more room for a larger work-piece. Instead of holes 78, 102, a slot 104 can be used in heel block 32 of clamp 14 as shown in FIG. 1.

Those familiar with the mechanical arts will understand that there are numerous ways to form heel block 32 and clamp block 34 and a separation bolt 36 and a tightening bolt 38 so that the two blocks can be moved in parallel to adjust to the thickness of work-piece 16 and then tightened against it. For example, a slot can be tiered to receive a non-round bolt head that cannot rotate once in the tier of the slot.

In use, the present method for clamping a work-piece 16 to a milling machine table 12 is to use the front T-slot 26 to secure a clamp 14 that extends laterally outward—that is, away from milling machine table 12—and then above top surface 20 of table 12 to receive the work-piece 16 in the jaws of a clamping system 10. In particular, a work-piece 16 is placed on top surface 20 of milling machine table 12. A clamp 50 is selected and its second end 66 is rotated into T-slot 26. Then the separation between heel block 52 and clamp block 54 is adjusted by rotating clamp block 54 with respect to heel block 52 about separation bolt 56 until the two blocks are just slightly farther apart than the thickness of work-piece 16. Tightening bolt 62 is inserted into the nearest hole 78 of heel block 52 and pushed through slot 76. Then nut 64 is used to tighten tightening bolt 62 so that second end 66 and second end 68 clamp down on work-piece, holding it securely to milling machine table 12.

If clamp 80 is selected, the process is essentially the same except that second end 96 of heel block 82 is inserted in to T-slot 26 from the end of T-slot 26 and slid laterally along T-slot to the desired location rather than by rotating it into T-slot 26.

Those skilled in the machine tool trade will appreciate that many substitutions and modifications can be made to the preferred embodiments described above without departing from the spirit and scope of the invention, defined by the appended claims.

What is claimed is:

1. A clamp for use with a milling machine having a work surface and a front side, said front carrying a T-slot, said clamp comprising:

a heel block having a first end and an opposing second end, said second end having a nose shaped to facilitate insertion and securement in said T-slot;

a clamp block having a first end, an opposing second end, and a hole formed therein;

a threaded tightening nut;

a separation bolt running between said first end of said clamp block and said first end of said heel block, said separation bolt holding said heel block and said clamp block in spaced relation; and a tightening bolt running between said clamp block and said heel block, said tightening bolt having a first threaded end extending through said hole in said clamp block, and wherein said tightening nut is threaded to said first threaded end of said tightening bolt in order to apply compression at said second end of said clamp block so that a workpiece on said surface of said milling machine can be held in place by said clamp.

2. The clamp as recited in claim 1, wherein said nose of said second end of said heel block is formed to be inserted into position in said T slot by pivoting said heel block about said nose.

3. The clamp as recited in claim 1, wherein said hole in said clamp block is a slot, and said tightening bolt has a second threaded end opposing said first threaded end, and said heel block further comprises at least one tapped hole into which said second threaded end of said tightening bolt can be threaded so that the position of said tightening bolt can be moved to different positions along said heel block.

4. The clamp as recited in claim 1, wherein said heel block has a slot formed there in dimensioned to receive said tightening bolt, said tightening bolt having a bolt head on one end, said slot.

5. The clamp as recited in claim 1, wherein said second end of said heel block is formed to facilitate insertion from a direction generally perpendicular to the long dimension of said T-slot.

6. The clamp as recited in claim 1, wherein said heel clamp has a dead end hole formed therein and where in said separation bolt is dimensioned to be received within said dead end hole.

7. A clamping system, comprising:

a milling machine having a work surface and a front side, said front side carrying a T-slot;

a heel block having a first end and an opposing second end, said second end having a nose shaped to facilitate insertion and securement in said T-slot;

a clamp block having a first end, an opposing second end, and a hole formed therein;

a threaded tightening nut;

a separation bolt running between said first end of said clamp block and said first end of said heel block, said separation bolt holding said heel block and said clamp block in spaced relation; and a tightening bolt running between said clamp block and said heel block, said tightening bolt having a first threaded end extending through said hole in said clamp block, and wherein said tightening nut is threaded to said first threaded end of said tightening bolt in order to apply compression at said second end of said clamp block so that a workpiece on said work surface of said milling machine can be held in place.

8. The clamping system as recited in claim 7, wherein said second end of said heel block is formed to facilitate insertion by a direction generally perpendicular to the long dimension of said T-slot.

9. The clamping system as recited in claim 7, wherein said hole in said clamp block is a slot, said tightening bolt has a second threaded end opposing said first threaded end and heel block further comprises at least one tapped hole into which said second threaded end of said tightening bolt can be threaded so that the position of said tightening bolt can be moved relatively closer to said first end of said heel block.

10. The clamping system as recited in claim 7, wherein said heel block has a slot formed there in dimensioned to receive said tightening bolt, said tightening bolt having a bolt head on one end, said slot being dimensioned smaller than said bolt head.

* * * * *

UNITED STATES PATENT AND TRADEMARK OFFICE

CERTIFICATE OF CORRECTION

PATENT NO. : 6,406,229 B1 
DATED : June 18, 2002
INVENTOR(S) : Derrick et al.

It is certified that error appears in the above-identified patent and that said Letters Patent is hereby corrected as shown below:

<u>Column 3,</u>
Line 21, insert -- manner -- delete "mariner"

<u>Column 5,</u>
Line 2, after "one end, said slot" insert -- being dimensioned smaller than said bolt head --.

Signed and Sealed this

Nineteenth Day of November, 2002

*Attest:*

JAMES E. ROGAN

*Attesting Officer* *Director of the United States Patent and Trademark Office*